Jan. 2, 1923.
C. A. MIDDAUGH.
DEPOSIT BOOK.
FILED APR. 10, 1922.
1,440,481
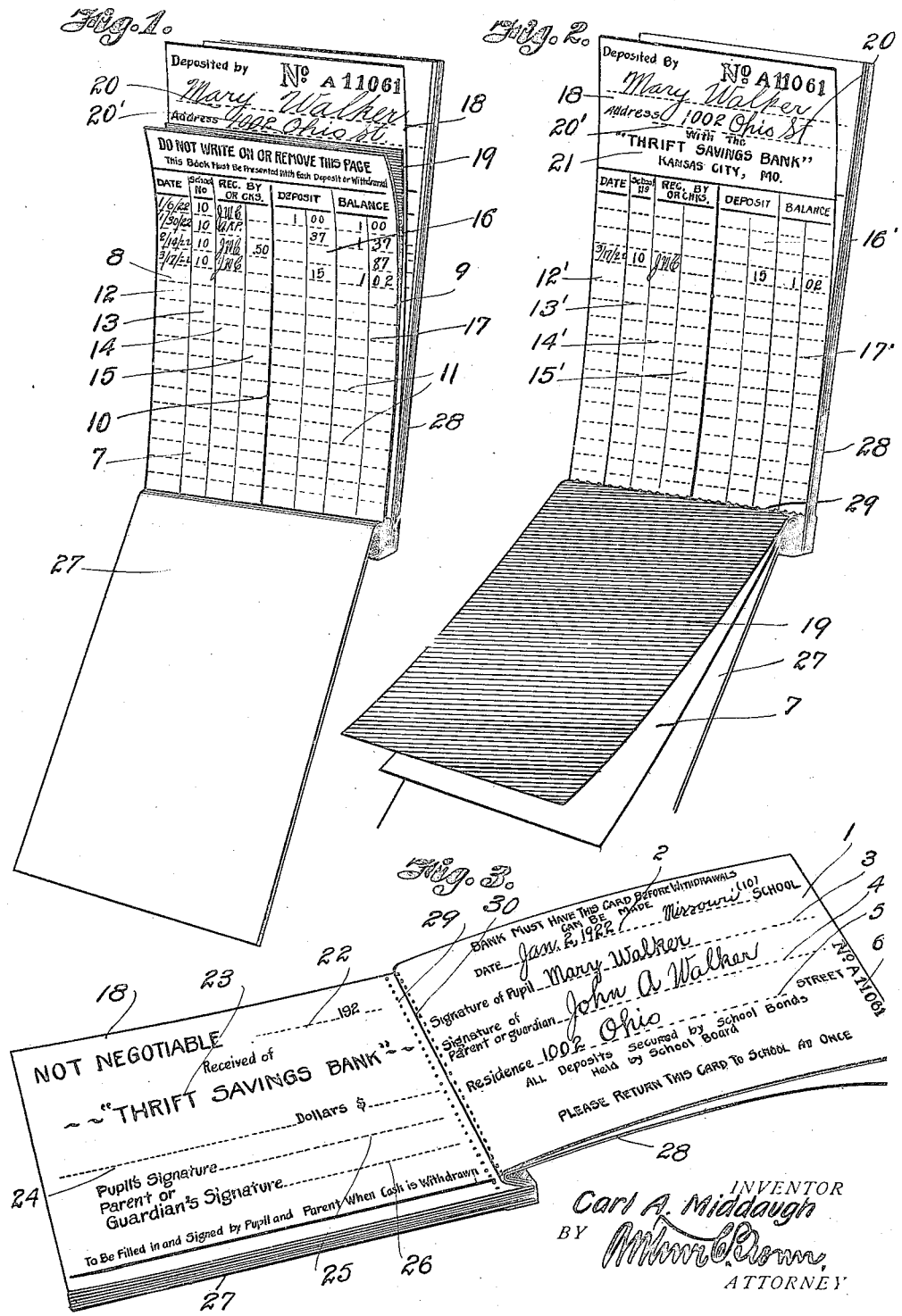

Patented Jan. 2, 1923.

1,440,481

UNITED STATES PATENT OFFICE.

CARL A. MIDDAUGH, OF KANSAS CITY, MISSOURI.

DEPOSIT BOOK.

Application filed April 10, 1922. Serial No. 551,086.

*To all whom it may concern:*

Be it known that I, CARL A. MIDDAUGH, a citizen of the United States, residing at Kansas City, in the county of Jackson and State of Missouri, have invented certain new and useful Improvements in Deposit Books; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to deposit books to be used in connection with banking or savings accounts and the primary object of the invention is to provide a novel form of book which may be especially adapted for use in taking care of small deposits. For example, in order to teach thrift to school children there has been established in some of the banks in certain cities of this country, school savings departments.

These departments have representatives in the schools who receive deposits from the school children and accredit them to their accounts in the bank. Under the system the pupil may open an account for a very small amount by depositing the amount with a representative in the school, who issues a book to the pupil, makes an entry in the book and on a deposit sheet to be forwarded to the bank with the deposit; the deposit sheet also serving as a ledger sheet to automatically show the balance of the depositor.

Obviously, it would be unprofitable to handle these small accounts if the handling involved considerable bookkeeping, such as is necessary in handling large accounts.

My invention simplifies the handling of the accounts in that the deposit sheet or ticket may serve as a ledger leaf, thereby eliminating all postings and extensions. The deposit sheet also serves as a withdrawal order or check and there is a pass-book sheet containing on its face all of the entries on the separate deposit sheets or withdrawal orders so that the bookkeeping is materially simplified.

In order to comprehend the advantages and novel features of my invention, reference will be had to the following description in connection with the accompanying drawings, in which—

Fig. 1 is a perspective view of a book constructed in accordance with my invention, showing the entries made on the pass-book sheet.

Fig. 2 is a similar view showing the entry made on a deposit sheet, and

Fig. 3 is a perspective view of the book showing the withdrawal order blank on the reverse side of the deposit sheet and the identification card.

The book may be constructed in the usual manner with the leaves bound in any appropriate way. The back of the book is a signature card 1, having a space 2 for the date that the account was opened and the number of the school which the pupil attends. Below this is a second space or line 3 for the signature of the pupil and a third space or line 4 for the signature of a parent or guardian. Below that is a line 5 for the address.

It will be seen that the pupil cannot open an account without the consent of a parent or guardian, who must sign the card and, as will appear hereinafter, who must sign each withdrawal order so that the pupil cannot withdraw the account without the knowledge of the parent or guardian.

The signature card may have suitable identifying indicia 6, such as the number of the book or the number of the account which, of course, will be the number of the file in which the signature card and the sheets are deposited.

In the front of the book is a pass-book sheet 7, which is permanently retained in the book and it is divided into two longitudinal main divisions 8 and 9 by the central divisional line 10. There are transverse lines 11 to provide spaces, the number of spaces being one in excess of the number of combined deposit ticket and ledger leaf and withdrawal order sheets.

The space 8 is divided into four vertical columns, the column 12 being the date column, the column 13 being the column for the number of the school to identify the school at which the pupil attends, the column 14 being for the teller's identifying indicia, such as the initials, number, etc., and the column 15 being the withdrawal amount column. On the opposite side of the longitudinal center of the sheet are two additional columns; the column 16 being the deposit column and the column 17 the balance column.

Between the pass-book sheet 7 and the combined deposit ticket-ledger leaf and withdrawal order sheet 18 is a manifolding or carbon sheet 19, the carbon face of the carbon sheet being directed toward the sheets 18 so that every entry which is made upon the face of the pass-book sheet will be transferred onto the next sheet 18 beneath it.

At the top of each sheet 18 is a line 20, which is for the name of the pupil, a line 20' for the address and below it is indicia 21 to indicate the bank with which the account has been opened. Below the indicia 21 and arranged to coincide line for line and column for column with the pass-book sheet are rulings to provide columns 12', 13', 14' and 15', corresponding in detail to the columns 12, 13, 14 and 15 on the sheet 7. The sheet 18 also has columns 16' and 17' which correspond to the deposit and balance columns 16 and 17 on sheet 7.

Therefore, it will be seen that the lower part of the sheets 7 and 18 are duplicates.

On the back of the sheet 18 is a withdrawal order blank having a space 22 for the date, indicia 23 to indicate the bank at which the deposit has been placed, a line 24 for the amount to be withdrawn, a line 25 for the signature of the pupil, and a line 26 for the signature of the parent or guardian. While the sheet 7 is permanently secured in the book between the cover leaves 27 and 28 of the book, the sheets 18 may be removed by tearing along the perforations 29 and the card which may be removed by tearing along the perforations 30.

The manner of using the book is as follows:

Suppose the pupil desired to open an account, the representative of the bank at the school will accept the first deposit, say one dollar ($1.00). The pupil is given the signature card 1 to sign and to be countersigned by the parent or guardian. The representative makes an entry, for example 1—6—22, school 10, J. W. C. in the respective columns 12, 13 and 14. In the deposit column an entry of $1.00 is made and in the balance column an entry of $1.00 is made. This entry on the first line of the permanently secured pass-book sheet will be transferred to the first sheet 18 through the medium of the carbon sheet 19. The name of the pupil or depositor and the address will have to be written is separately.

The book is handed to the depositor and the card 1, the first sheet 18 and the amount of the deposit ($1.00) is forwarded to the bank and filed according to the system there prevailing, either by number of the book or by the name of the depositor.

If the depositor makes a subsequent deposit on the 30th of January, 1922, a similar entry is made on line 2 of the pass-book sheet 7, indicating that on the 30th of January, 1922, from school 10 the representative received a deposit, for example thirty-seven cents (37¢). The account will be extended to the balance column showing that $1.37 has been deposited. The second sheet 18 will be forwarded to the bank with the thirty-seven cents and the bank will know that this is the second deposit because it has been entered on the second line of the deposit slip or ticket. Therefore, in order to prove up the deposit, it will be only necessary to look up the first slip and compare it with the amount received to indicate that the account stated on the deposit slip is correct.

Later the depositor may wish to withdraw part of the account; for example, on February 14th the depositor withdraws fifty cents (50¢). The date on which the withdrawal is made will be put in the first column 8 on the third line, the school number of the third line in the column 13, the paying teller's initials in column 14, and the amount of the withdrawal, that is 50¢, in the column 15. The next entry will be in the balance column, showing a balance of 87¢, or 50¢ less than $1.37, the previous amount deposited.

Obviously the entry will be transferred to the third sheet 18, showing that the third sheet is a withdrawal check. The bank clerk will immediately know that an amount has been withdrawn so that he will turn over the sheet to the back side on which the withdrawal order sould be filled out to see that the withdrawal order is properly signed by the depositor and by the parent or guardian. If the order is for 50¢ and the last sheet previously deposited shows that the balance was $1.37, the front face of the withdrawal order should show the balance 87¢, as indicated in Fig. 1, so that the bank clerk will know that the slip is in order.

Later suppose the depositor adds 15¢ to the account. The representative will write in the date, for example, 3—17—22 in the column 12, school No. 10, the initials, and in the deposit column 15¢. This added to the previous balance of 87¢ will make the balance $1.02.

This entry on the pass-book sheet must necessarily come on the fourth line bacause there have already been three entries made. It should, therefore, be transferred to the fourth sheet 18 on the fourth line, as indicated in Fig. 2, only the last entry, of course, being transferred to the fourth sheet 18 so that it will have exactly the appearance shown in Fig. 2. This sheet, together with the 15¢, is forwarded to the bank and the bank clerk notes that the previous slip showed a balance of 87¢ and that there is 15¢ accompanying the present slip, so the addition of the two makes $1.02.

It will be apparent that every time an entry is made on the pass-book, it will be transferred onto a corresponding transverse space or line on the proper sheet and there is a special advantage in this because if the deposit slip should come into the bank with an entry made on the sixth line and there has only been three deposits previously received, the bank clerk would immediately know that there was some discrepancy in the handling of the account and he could immediately get in touch with the depositor and clear up the error or discrepancy, as the case might be.

When it is understood that each sheet 14 is immediately filed as a ledger sheet, it will be apparent that the need for posting and extensions can be eliminated.

The carbon sheet 19 may be eliminated if desired, and the entry made separately on the deposit ticket or ledger leaf and withdrawal order sheet, although I do not recommend this method because of the liability of error. When the entries are made upon the pass-book sheet 7 with the carbon sheet 19 between it and the next sheet 18, the entries on both sheets must match up as to position but where they are transferred separately, there is liability of error in not making the entry on the next sheet 18 at the proper place.

It will be apparent from the foregoing that the entire account of any depositor can be kept in a most convenient manner by using the blanks of which the book consists and that the cost of taking care of the account will be reduced to a minimum because there will be no bookkeeping other than the first entry made in the book and the transferring of the deposit sheets 18 to the file where they function as ledger pages.

What I claim and desire to secure by Letters-Patent is:

1. A deposit book containing one permanent pass-book sheet and a plurality of removable deposit sheets, the pass-book sheet having lines and spaces corresponding as to place and position with similar lines and spaces on the deposit sheets, and a carbon sheet back of the permanent pass-book sheet so that an entry made upon the pass-book sheet will be transferred onto a corresponding part on the removable deposit sheet, the obverse face of the deposit sheet provided with a printed withdrawal blank to be filled in with the amount to be withdrawn as indicated on the pass-book sheet and the opposite face of the deposit sheet.

2. A deposit book containing a permanent pass-book sheet having the following appropriately designated columns a date column, a school number column, a teller's indicia column, a withdrawal amount column, a deposit column, and a balance column, and a plurality of removable deposit sheets in the book being ruled and designated to correspond with the permanent pass-book sheet and having on their obverse faces suitably printed withdrawal blanks into which the amount to be withdrawn may be written to correspond with the amounts on the withdrawal column on the opposite faces of the deposit sheets, and on the face of the pass-book sheet.

In testimony whereof I affix my signature.

CARL A. MIDDAUGH.